March 26, 1968     R. S. RICHARDS     3,375,341
METHOD AND APPARATUS FOR ELECTRICAL STOCK REMOVAL
Filed July 24, 1964
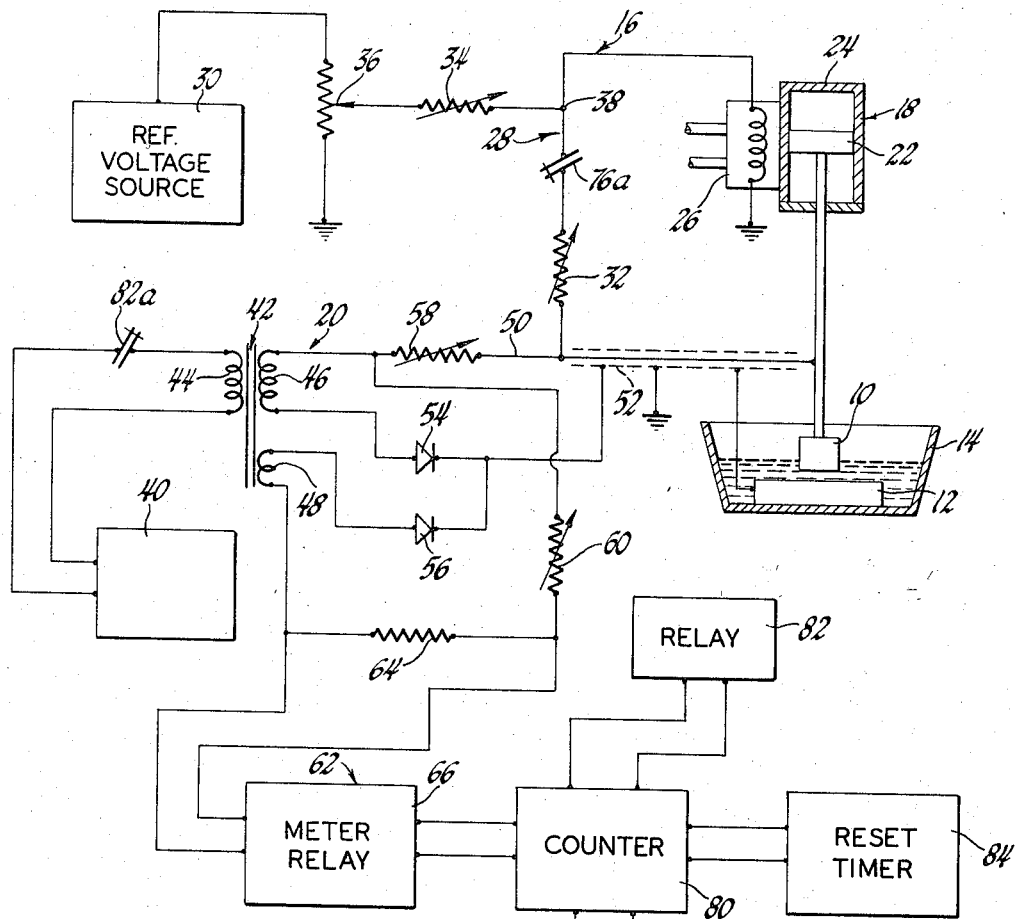
Fig.1
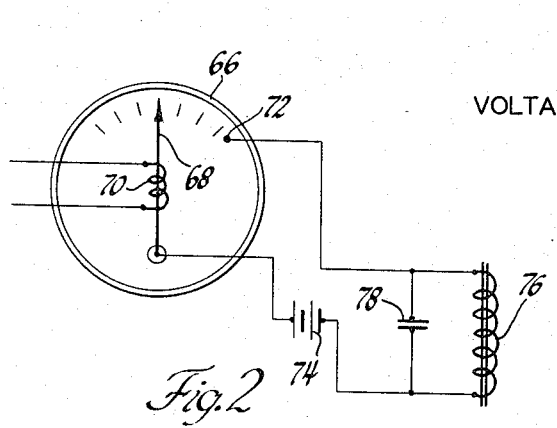
Fig.2
Fig.3
INVENTOR.
Robert S. Richards
BY
Hugh L. Fisher
ATTORNEY

United States Patent Office 3,375,341
Patented Mar. 26, 1968

3,375,341
METHOD AND APPARATUS FOR ELECTRICAL STOCK REMOVAL
Robert S. Richards, Oak Park, Mich., assignor to General Motors Corporation, Detroit, Mich., a corporation of Delaware
Filed July 24, 1964, Ser. No. 385,004
11 Claims. (Cl. 219—69)

ABSTRACT OF THE DISCLOSURE

A power supply for electrical discharge machining apparatus incorporating a dual secondary transformer which applies a modified full-wave voltage across the machining gap. One secondary provides a low voltage across the gap between gap discharges to provide a burning current and is utilized by an arcing control to sense an arcing condition. The arcing control includes a meter relay, which responds to the arcing condition and causes the cutting tool and workpiece electrodes to be separated so as to clear the arcing condition. The arcing control also counts the number of separations of the electrodes within a certain time interval and, if excessive, causes the power to be turned off.

---

This invention relates to improved method and apparatus for electrically removing stock from a conductive workpiece.

The electrical stock removal process, such as that known as electrical discharge machining, can by its inherent nature if not carefully controlled cause damage, possibly irreparable, to the workpiece being machined and also present a hazard to the operator. A specific example of this occurs when the accumulation of debris such as carbon within the gap causes a build-up to the extent that the electrodes begin to separate. If the electrodes are forced to separate too far by this accumulation of carbon, the possibility of an explosion or even a fire arises, particularly if one of the electrodes approaches the surface of the dielectric fluid. Moreover this accumulation produces arcing which, if permitted to continue, can not only produce the mentioned explosion or fire but also locally damage the workpiece. Of course if large and expensive forging dies are being machined any irreparable damage to the workpiece can be costly.

One way of controlling arcing is by sensing the frequency of the discharges across the gap. If from past experience it is known that a certain frequency indicates an arcing condition, the cutting tool and workpiece electrodes can be separated. The problem with sensing frequency is that it is not entirely reliable and, moreover, in actual practice the controls required are quite complicated and expensive, and even they cannot be depended upon to give the needed quick response, primarily because the number of expected discharges across the gap cannot always be predicted due to the numerous changing conditions, such as dielectric contamination, gap spacing, etc. Moreover, the frequency of the discharges usually does not change to any perceptible extent when the arcing condition is just commencing. Then too, the difference between the current drawn during normal machining and when the arcing condition commences is not sufficiently great enough to be accurately sensed and, hence, the arcing condition must become relatively pronounced before it is detected and the appropriate steps can be taken.

To overcome these problems method and apparatus are now proposed for controlling arcing by quickly sensing it with an inexpensive, uncomplicated control. More particularly, the invention contemplates applying current of a relatively low magnitude to the gap between discharges, and if an arcing condition is developing the change in this reduced current will be of a character that is easily and almost instantaneously sensed.

It is also proposed, if an arcing condition persists and a certain number of efforts have been made to overcome it, to interrupt the process; more specifically, reduce or shut off the power.

The foregoing and other objects and advantages of the invention will be apparent from the following description and from the accompanying drawings, in which:

FIGURE 1 is a schematic diagram of apparatus incorporating the principles of the invention;

FIGURE 2 is a schematic diagram of a meter relay used in the FIGURE 1 system; and FIGURE 3 is a graph of gap voltage occurring with the FIGURE 1 apparatus.

Referring now to the drawings in detail and initially to FIGURE 1, the numerals 10 and 12 denote electrodes that hereinafter will be referred to as the cutting tool and the workpiece, respectively. The workpiece 12 is positioned within and insulated from a container 14 filled with a suitable ionizable fluid, which in the electrical discharge machining process is a dielectric fluid. The proper gap spacing is maintained by a gap spacing control, shown generally at 16, and a motor, designated generally at 18. The machining energy is provided by a power supply, denoted generally at 20, in a way well known to those versed in the art. The energy from the power supply 20 is supplied to the gap between the cutting tool 10 and the workpiece 12 so as to produce time-spaced discharges therebetween, assuming the gap spacing is properly maintained by the gap spacing control 16 and the motor 18. Polarities may without limitation be such that the cutting tool 10 is the cathode and the workpiece 12 the anode. These polarities, of course, may be reversed where desirable dependent upon dielectrics, materials being machined and other factors, also well understood by those versed in the art.

The motor 18 may be of any known type; e.g., similar to that disclosed in the Patent 3,059,150 to Colten et al., and utilize a piston 22 slidable within a housing 24. The opposite ends of the piston 22 are supplied with pressure fluid from an appropriate source, not shown, subject to the control of a force motor 26. A suitable force motor 26 is also described in the aforementioned patent. The gap spacing control 16 utilizes gap voltage as a source of control. This is done through the agency of a summing circuit, viewed generally at 28, that communicates both with the gap and a reference voltage source 30, respectively, through adjustable impedances 32 and 34 selected to provide the desired voltage characteristics. The reference voltage can be varied by maneuvering an adjustable resistor 36. Therefore and by way of example only, if the reference voltage is a positive forty volts and the gap voltage a minus forty volts the error signal voltage at a junction 38 for the summing circuit 28 is zero. Hence, the force motor 26 will maintain its status as will the motor 18 and whatever the gap spacing is will be continued. As machining proceeds, the gap spacing will increase as will the gap voltage; consequently, a negative summed error signal voltage will be developed and applied to the force motor 26. This error signal voltage, in effect, advises the motor 18 to advance the cutting tool 10 until a null is again attained. Although the cutting tool 10 is being maneuvered in this embodiment, it should be kept in mind that the workpiece 12 can be moved or, if preferred, both the cutting tool 10 and the workpiece 12 moved.

The power supply 20 derives power from an appropriate pulse source 40, which may be in the form of a motor-generator or an oscillator that is coupled via a transformer 42 to the gap. This transformer 42 includes a primary 44 connected to the pulse source 40 and main and auxiliary secondary windings 46 and 48. If loading is a problem a tank circuit, not shown, may be incorporated for achieving an optimum power factor.

The secondary windings 46 and 48 are each connected across the gap by a conductor 50, which is electrically joined to the cutting tool 10, and a grounded coaxial cable 52, which is electrically connected to the workpiece 12. The outputs of the windings 46 and 48, respectively, have unidirectional conducting devices; e.g., rectifiers 54 and 56, so poled as to provide a modified full-wave rectified voltage of negative polarity to the gap, such as shown in FIGURE 3. During the initial half cycle the gap voltage will be of the larger value and supplied from the main winding 46, whereas during the next half cycle the winding 48 is effective and the lower voltage is applied to the gap. These voltages may be modified by respectively adjusting series resistors 58 and 60.

The adjustment of the resistor 58 enables the stock removal rate to be controlled and, accordingly, the finish. For instance, if the resistance of the resistor 58 is increased the net gap voltage will reduce and consequently the stock removal rate. This permits a finer finish to be obtained and closer control of overcut. The contrary occurs if the resistance of the resistor 58 is reduced, i.e., the gap voltage increases with an increased stock removal rate and a somewhat coarser finish. The resistor 58 has an additional function; namely, it serves to isolate the cutting gap from the source 40. Hence, when short circuits occur in the gap the resultant increased and often excessive voltage is dropped across this resistor 58. In effect, the resistor 58 performs as a current limiter.

The function of the auxiliary winding 48 is two-fold. First, it serves as a source of so-called burning current, as described in Patent No. 3,213,258, issued Oct. 19, 1965, in the name of Millard A. Ferguson, and entitled "Electrical Stock Removal Method and Apparatus." Briefly, the level of the voltage derived from this winding 48 is so adjusted as to be always less than required to produce a true gap breakdown, but sufficient to cause a burning current flow through the gap. This burning current melts the products of a discharge remaining in the gap and tending to form bridges across the gap. These melted particles react with the gas produced by the cracking of the dielectric fluid during the discharge and form a hardened carbide layer of material on the exterior surface of the cutting tool 20. Consequently, the life of the cutting tool is enhanced, resulting in substantial savings in cutting tool materials as well as reduced down time and gives a better definition on the workpiece.

The second function of the auxiliary winding 48 is to provide a way of accurately and quickly sensing an arcing condition. It has been found that if the main cutting current is sensed and conventionally 200 amps would be adequate, an arcing condition only causes the machining current to increase perhaps to 240 amps. This may not occur instantly, and when it does it represents only a 20% increase and one that can be difficult to accurately and predictably sense. On the other hand, the auxiliary winding 48 supplies approximately 1 to 4 amps of current between discharges. If an arcing condition exists, this current increases from 10 to 40 amperes, a very large and substantial percentage increase that can be immediately and accurately detected without the need for extremely sensitive apparatus which is usually both complex and costly. Such a system for controlling these arcing conditions is shown generally at 62.

Considering the details of the arcing control 62, resistor 64 is arranged in series with the auxiliary winding 48 so as to perform as a current shunt. Therefore, the current passing through the shunt resistor 64 causes a corresponding voltage drop which is sensed by inexpensive meter relay 66. The meter relay 66 may be of any commercial type. One simple type is illustrated in FIGURE 2. As shown there the meter relay 66 comprises a pivotably movable indicator needle 68 on which is wound a sensing winding 70. When the average current through the shunt resistor 64 exceeds some pre-established amount the indicator needle 68 will be urged clockwise by the corresponding magnetic force until it engages a contact 72. This completes a circuit from a suitable source; e.g., a battery 74, through a relay winding 76, thus energizing the relay winding 76 and opening associated normally closed contacts 76a in the summing circuit in FIGURE 1. The opening of the contacts 76a causes the reference voltage to dominate the control, and accordingly the motor 18 will rapidly retract the cutting tool 10. This retraction will eliminate the arcing. Hence, the current flow through the shunt resistor 64 will quickly reduce so that the indicator needle 68 will move out of engagement with the contact 72. The resultant deenergization of the relay winding 76 is delayed by the action of a time-delay condenser 78 installed in parallel with the relay winding 76. Since the condenser 78 will have become charged when the relay winding 76 is first energized, it will discharge through the relay winding 76. The condenser discharge will maintain the relay winding 76 energized and accordingly the contacts 76a open long enough to insure that the cutting tool 10 is retracted the proper distance for clearing the gap of whatever debris or condition causes the arcing. Then when the charge on the condenser 78 is dissipated, the relay winding 76 will deenergize and the contacts 76a again close. This reinitiates the supply of gap voltage to the summing circuit 28 and it will be of its maximum open circuit voltage. Hence, there will be a rapid downfeed of the cutting tool 10 by the motor 18. Once the proper gap spacing is reestablished, the process will be resumed.

Sometimes when machining complicated shapes the arcing condition will continue to reoccur. Thus, unless the operator is very attentive the condition can continue unnoticed. When it is noted the operator will have to cut off the power and investigate the cause. Obviously, during this interim many separating cycles may occur. For this reason a conventional counter 80 is connected to the meter relay 66 so as to count the number of times the meter relay 62 is actuated. If this number is, for example, five times within a thirty second interval, the counter 80 in a usual way will develop an output adequate to energize another relay 82 that controls normally closed contacts 82a between the pulse source 40 and the transformer 42. This will cause the cutoff of machining power. A suitable reset timer 84 resets the counter 80 so as to time out for the selected time interval, in this instance the thirty seconds. This insures that fluctuations induced by inherent transients in the process do not cause a shutdown and as well as establishes the number of repetitions of the arcing condition that will be tolerated for a particular job.

Reviewing briefly the operation of the arcing control 62, assuming that the gap spacing is proper and that power is being supplied to the gap to give the previously explained modified full-wave voltage characteristics displayed in FIGURE 3, the process will continue with 1 to 4 amps of current being drawn between electrical discharges, and hence the voltage drop across the shunt resistor 64 will not be adequate to cause the indicator 68 of the meter relay 66 to be moved beyond its normal position. If now carbon deposits and the like commence to accumulate within the gap and are not burned and washed away during normal operation or the cutting tool 10 at one or more points becomes too close to the workpiece 12, the undesired arcing condition will occur. The current will increase through the shunt resistor 64 and cause the indicator 68 to engage the contact 72. This, in the way explained, energizes relay winding 76 and causes the normally closed contacts 76a in the summing circuit 28 to be open. It should be again noted here that the outputs of the windings 46 and 48 go on and off during alternate half cycles because of the action of the rectifiers 54 and 56. Also, that during normal operation no current may be drawn from the auxiliary winding 48 for several cycles for various reasons. If arcing continues and occurs five times within the thirty second interval mentioned before, then in the way described the relay 82 is energized by the resultant output developed by the counter 80 and normally closed contacts 82 are opened removing cutting power. The operator can take the proper steps to remove the source of this continuous arcing.

As will now be appreciated, a very simplified arcing control is provided, involving a minimum of cost and which additionally shuts off the power if the arcing condition persists. By using the auxiliary winding 48 the number and frequency of the main machining discharges are of no concern since they in themselves may be erratic and not really reflect an arcing condition. If arcing is taking place the very minimum current being drawn from the auxiliary winding 48 is very substantially increased, facilitating the sensing of the change; whereas the main machining current may not and often does not increase substantially, at least when the arcing condition is beginning to develop. The auxiliary winding 48 also offers the added advantage of providing burning current for developing the wear inhibiting surface on the exterior of the cutting tool 10.

The invention is to be limited only by the following claims.

What is claimed is:

1. In electrical stock removal apparatus, the combination of cutting tool and workpiece electrodes spaced apart so as to form a machining gap therebetween, a source of pulsating electrical energy, a transformer having a primary winding communicating with the source and main and auxiliary secondary windings each connected across the gap and each including a one-way conducting device so arranged that time-spaced high current electrical stock removing discharges and low current discharges are alternately produced across the gap, and means controlling arcing conditions within the proximity of the electrodes, the controlling means including means sensing current flow through the auxiliary secondary winding, means operated by the current sensing means for causing the electrodes to be separated when the current flow exceeds a certain value indicating an arcing condition, and counter means counting the number of separations of the electrodes within a certain time internal and operative when the number of separations within the certain time interval exceeds a certain number to cause the electrical energy to be cut off.

2. In electrical stock removal apparatus, the combination of cutting tool and workpiece electrodes spaced apart so as to form a machining gap therebetween, a source of pulsating electrical energy, a transformer having a primary winding communicating with the source and main and auxiliary secondary windings each connected across the gap and each including a one-way conducting device so arranged that time-spaced high current electrical stock removing discharges and low current discharges are alternately produced across the gap, means controlling the gap spacing, and means controlling arcing conditions within the proximity of the electrodes, the controlling means including means sensing current flow through the auxiliary secondary winding and relay means operated by the current sensing means for causing the gap spacing controlling means to separate the electrodes when the current flow exceeds a certain value indicating an arcing condition, the relay means including a time delay element for maintaining the relay means operative until the electrodes are separated a predetermined distance.

3. In electrical stock removal apparatus; the combination of cutting tool and workpiece electrodes spaced apart so as to form a machining gap therebetween, power supply means producing time-spaced electrical stock removing discharges across the gap; means controlling the gap spacing; means controlling arcing conditions within the proximity of the electrodes; the controlling means including means responsive to current flow between the electrodes and operative to cause the gap spacing controlling means to separate the electrodes when the current exceeds a certain value indicating an arcing condition; and counter means turning off the power from the power supply means when the number of separations of the electrodes exceeds a predetermined number within a certain time interval.

4. In electrical stock removal apparatus; the combination of cutting tool and workpiece electrodes spaced apart so as to form a machining gap therebetween; power supply means producing time-spaced electrical stock removing discharges across the gap; means controlling the gap spacing; means controlling arcing conditions within the proximity of the electrodes; the controlling means including means responsive to current flow to the electrodes between discharges and means operated by the current responsive means for causing the gap spacing controlling means to separate the electrodes when the current exceeds a certain value indicating an arcing condition; and counter means turning off the power from the power supply means when the number of separations of the electrodes exceeds a predetermined number within a certain interval.

5. In electrical stock removal apparatus; the combination of cutting tool and workpiece electrodes spaced apart so as to form a machining gap therebetween; a power supply operative to produce time-spaced electrical stock removing discharges across the gap; means controlling arcing conditions within the proximity of the electrodes; the controlling means including means supplying current to the electrodes between discharges, means sensing the current from the current supplying means, means operated by the current sensing means for causing the electrodes to be separated when the current exceeds a value indicating the arcing condition, and time delay means for causing the means operated by the current sensing means to remain operative a certain time interval adequate for the electrodes to be separated a predetermined distance; and counter means cutting off the power from the power supply means when the controlling means has been rendered operative a predetermined number of times within a certain time interval.

6. In electrical stock removal apparatus; the combination of cutting tool and workpiece electrodes spaced apart so as to form a machining gap therebetween; machining current means operative to produce time-spaced electrical stock removing discharges across the gap; gap spacing control means maneuvering the electrodes so as to maintain a certain gap spacing therebetween, means controlling arcing conditions within the proximity of the electrodes; the controlling means including means supplying a reduced current to the electrodes between discharges and of a value less than the machining current and adequate to maintain the gap ready to conduct between discharges, means sensing the reduced current, and means operated by the reduced current sensing means for causing the gap spacing control means to separate the electrodes when the current exceeds a certain value indicating an arcing condition; and counter means counting the number of separations of the electrodes by the gap spacing control means within a certain time interval and operative when the number of separations within the certain time interval exceeds a certain number to render the machining current supply means inoperative.

7. In electrical stock removal apparatus; the combination of cutting tool and workpiece electrodes spaced apart so as to form a machining gap therebetween; a source of pulsating electrical energy; a transformer having a primary winding communicating with the source and main and auxiliary secondary windings each connected across the gap and each including a one-way conducting device so arranged that time-spaced high current electrical stock removing discharges and low current discharges are alternately produced across the gap; gap spacing control means maneuvering the electrodes so as to maintain a certain gap spacing therebetween; means controlling arcing conditions within the proximity of the electrodes; the controlling means including means sensing the current flow through the auxiliary secondary winding, and means operated by the current sensing means for causing the gap spacing control means to separate the electrodes when the current exceeds a certain value indicating an arcing condition; and means counting the number of separations of the electrodes by the gap spacing control means within a certain time interval and operative when the number of separations within the certain time interval exceeds a predetermined number to shut off the source.

8. In electrical stock removal apparatus; the combination of cutting tool and workpiece electrodes spaced apart so as to form a machining gap therebetween; a source of pulsating electrical energy; a transformer having a primary winding communicating with the source and main and auxiliary secondary windings each connected across the gap and each including a one-way conducting device so arranged that time-spaced high current electrical stock removing discharges and low current discharges are alternately produced across the gap; gap spacing control means maneuvering the electrodes so as to maintain a certain gap spacing therebetween; means controlling arcing conditions within the proximity of the electrodes; the controlling means including means sensing the current flow through the auxiliary secondary winding, and relay means operated by the current sensing means for causing the gap spacing control means to separate the electrodes when the current exceeds a certain value indicating an arcing condition; the relay means including a time delay element for maintaining the relay means operative until the electrodes are separated a predetermined distance; and means counting the number of separations of the electrodes by the gap spacing control means within a certain time interval and operative when the number of separations within the certain time interval exceeds a predetermined number to shut off the source.

9. The process of electrical stock removal by a series of time-spaced stock removing electrical discharges across a gap between conductive cutting tool and workpiece electrodes, comprising the steps of supplying power to the gap for producing the stock removing discharges, sensing current flow to the electrodes between discharges, altering the gap spacing by separating the electrodes when the current flow exceeds a certain value indicating an arcing condition within the proximity of the electrodes, and reducing the power when the number of gap spacing corrections within a certain time interval exceeds a predetermined number.

10. The process of electrical stock removal by a series of time-spaced stock removing electrical discharges across a gap formed between conductive cutting tool and workpiece electrodes, comprising the steps of supplying high current power to the gap for producing the stock removing discharges, supplying low current power to the gap between discharges adequate to maintain the gap ready to conduct, sensing the low current flow, separating the electrodes when the low current flow exceeds a certain value indicating an arcing condition within the proximity of the electrodes, and reducing the high current power when the number of separations of the electrodes within a certain time interval exceeds a predetermined number.

11. The process of electrical stock removal by a series of time-spaced stock removing electrical discharges across a gap formed between a conductive workpiece and cutting tool electrodes, comprising the steps of supplying high current power to the gap for producing the stock removing discharges, supplying low current power to the gap between the discharges adequate to maintain the gap alive, sensing current flow to the electrodes between the discharges, separating the electrodes for a certain interval when the low current flow exceeds a predetermined amount indicating an arcing condition within the proximity of the electrodes, and cutting off the power to the gap when the number of separations within a certain time interval exceeds a predetermined number.

References Cited
UNITED STATES PATENTS 2,482,524 9/1949 Vrooman.
3,283,212 11/1966 Davis et al. _____ 317—22

RICHARD M. WOOD, *Primary Examiner.*

R. F. STAUBLY, *Assistant Examiner.*